United States Patent [19]

Brunner et al.

[11] Patent Number: 4,680,073
[45] Date of Patent: Jul. 14, 1987

[54] METHOD AND APPARATUS FOR HEAT SEALING

[75] Inventors: Hans A. Brunner; Donald E. Vaughan, both of Chesterfield County, Va.

[73] Assignee: Reynolds Metals Company, Richmond, Va.

[21] Appl. No.: 839,938

[22] Filed: Mar. 17, 1986

[51] Int. Cl.⁴ .............................................. B32B 31/18
[52] U.S. Cl. ........................................ 156/250; 156/267; 156/269; 156/271; 156/510; 156/516; 156/583.5; 53/372
[58] Field of Search .................... 156/251, 267, 308.2, 156/250, 510, 583.5, 515, 269, 516, 259, 271, 530; 53/372, 416, 477, 479, 552, 545, 389; 493/82, 189, 193, 194, 195, 197, 200, 201, 202, 203, 206, 196, 224, 227

[56] References Cited

U.S. PATENT DOCUMENTS

| | | | |
|---|---|---|---|
| 2,441,940 | 5/1948 | Rohdin | 156/289 |
| 2,641,304 | 6/1953 | Biddinger et al. | 156/518 |
| 2,913,863 | 11/1959 | Sylvester et al. | 53/373 |
| 2,958,168 | 11/1960 | Vogt | 53/30 |
| 2,987,106 | 6/1961 | Sylvester et al. | 156/510 |
| 2,987,107 | 6/1961 | Sylvester et al. | 53/372 |
| 3,006,257 | 10/1961 | Orsini | 156/267 |
| 3,221,473 | 12/1965 | Brown | 53/373 |
| 3,340,678 | 9/1967 | Rhodes | 53/372 |
| 3,552,088 | 1/1967 | Niwa | 53/28 |
| 3,633,333 | 1/1972 | Schlemmer | 156/497 |
| 3,741,842 | 6/1973 | Joa | 156/250 |
| 3,914,917 | 10/1975 | Young | 53/228 |
| 3,923,577 | 12/1975 | Baab | 156/251 |
| 4,164,833 | 8/1979 | Todd | 53/545 |
| 4,529,471 | 7/1985 | Vaughan | 156/466 |

Primary Examiner—Caleb Weston
Attorney, Agent, or Firm—Alan T. McDonald

[57] ABSTRACT

A method and apparatus for heat sealing are disclosed. A fin seal is formed along the edge of the film, with the seal being trimmed immediately after being formed, and while still warm and in registry.

7 Claims, 2 Drawing Figures

METHOD AND APPARATUS FOR HEAT SEALING

BACKGROUND OF THE INVENTION

The wrapping of articles in plastics resin film is commonplace. Often, articles are wrapped in center folded film, with a hot wire sealer being employed to seal and cut the individual packages, as they are formed sequentially. This seal forms the back seal of the leading package and the front seal of the trailing package. A seal must also be formed along the open side edge opposite from the center fold.

With many films, such as polyethylene, polypropylene, and other similar materials, this side seam may also be formed by a hot wire sealer. The sealer forms a bead-like seal closely adjacent to the article being packaged and simultaneously trims excess film from the edge of the package.

Some plastics resin films, notably polyvinyl chloride films, do not react well to hot wire sealing, especially continuous hot wire sealing as is necessary along side seams. Such films exhibit smoke and build-up on the hot wire sealing and cutting surface. There is a need, therefore, for a reliable system for forming side seals on plastic resins films, such as polyvinyl chloride film, which do not react favorably to continuous hot wire sealing.

THE PRESENT INVENTION

By means of the present invention, such a reliable side sealing system is obtained.

In the present invention, a band sealer is employed to form a fin seal along the side edge of the film and, while the film is still in registry and warm, a trimmer removes excess material from the sealing region. By maintaining the film in registry during sealing and cutting, even side seals can be formed.

BRIEF DESCRIPTION OF THE DRAWINGS

The sealing and cutting system of the present invention will be more fully described with reference to the drawings in which.

DETAILED DESCRIPTION OF THE PREFERRED EMBODIMENTS

Figure 1:
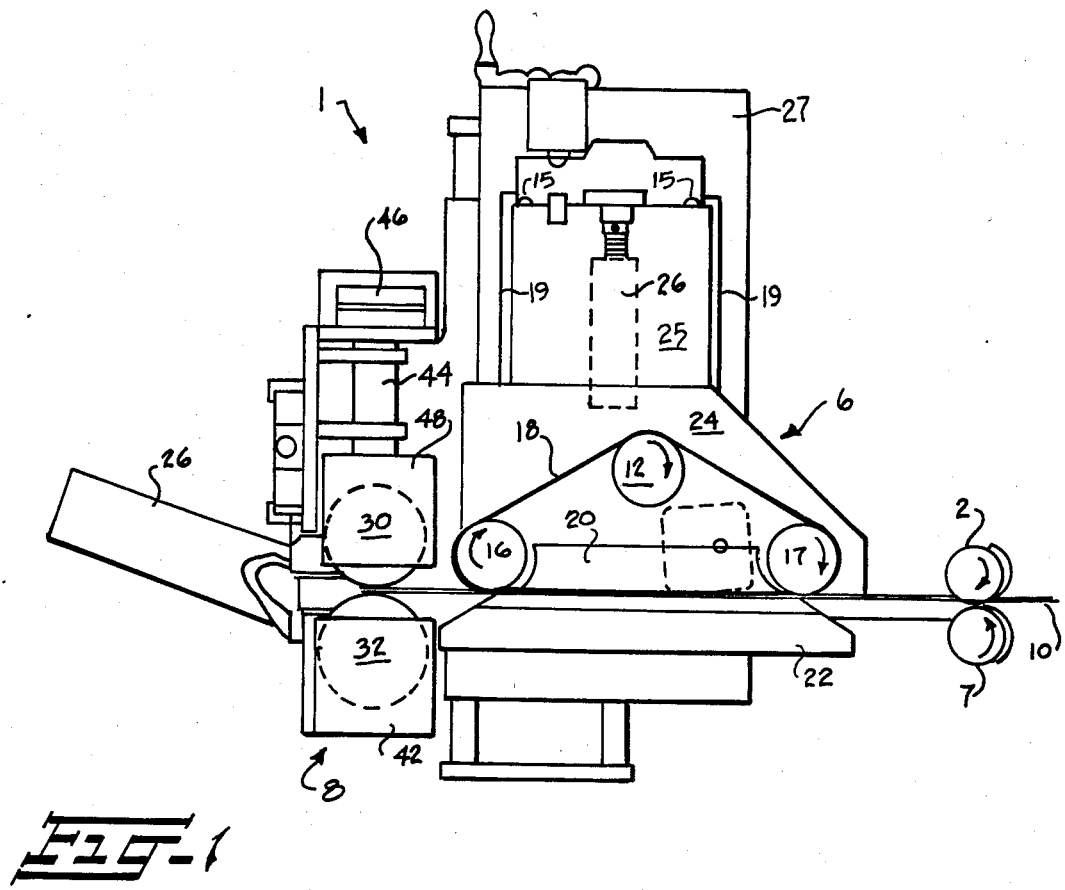
FIG. 1 is a side elevational view of the sealing system of the present invention.

Turning now to the FIGURES, and more particularly to FIG. 1, the method and apparatus of the present invention will be described. The sealing system 1 comprises crowder rolls 2 and 7, a band sealer, generally described as 6, and a cutting mechanism, generally described as 8.

The crowder rolls 2 and 7 guide film 10 through the system 1. Feed rolls 30 and 32, together with driven band 18 of sealer 6, feed the film 10 through the system 1. For illustrative purposes, film 10 is shown in edge view. However, in actual practice, film 10 comprises the open side edge of a continuous center folded film having articles placed therein to be formed into individual packages.

Band sealer 6 is similar in design to that disclosed in U.S. Pat. No. 4,529,471, the disclosure of which is hereby incorporated herein by reference. The band sealer 6 includes idler pulleys 12 and 17, driven pulley 16, band 18, and heater block 20. Heater block 20 is connected to a source of electrical current (not shown) and provides heat to band 18 sufficient to seal film 10 when contacted under pressure between band 18 and backup surface 22. Other than backup surface 22, band sealer 6 is mounted upon mounting plate 24, which plate is mounted for reciprocal motion, such as by means of air cylinder 26, attached to slide plate 25 by means of guide rollers 15 which ride on tracks 19 held by assembly 27, such that band 18 is brought into contact with film 10 only when film 10 is in motion and is removed from film 10 when film 10 is not in motion. Band 18 may be driven at a speed equal to or slightly slower than that of drive rollers 30 and 32. The band 18 provides a fin seal at the edge of film 10. This lap seal is significantly wider than a bead seal, which is formed by a hot wire sealer-cutter, and must be trimmed to provide an acceptable package.

Trimming occurs at cutter 8. Cutter 8 is positioned closely adjacent to band sealer 6, such that the film 10 remains in registry and an even width of excess sealed film may be removed. Since cutter 8 must be positioned closely adjacent to band sealer 6, cutter 8 cuts the film 10 while still at an elevated temperature. Thus, a simple slitter knife may not be used, and the cutter 8 structure, which will be more fully described below, is employed.

The excess film which has been trimmed by cutter 8 is removed by means of waste removal means 26. Typically, this waste removal means 26 is a vacuum suction device, which will continuously receive the scrap material cut from film 10 by cutter 8 and remove it to a waste storage means (not shown).

Figure 2:
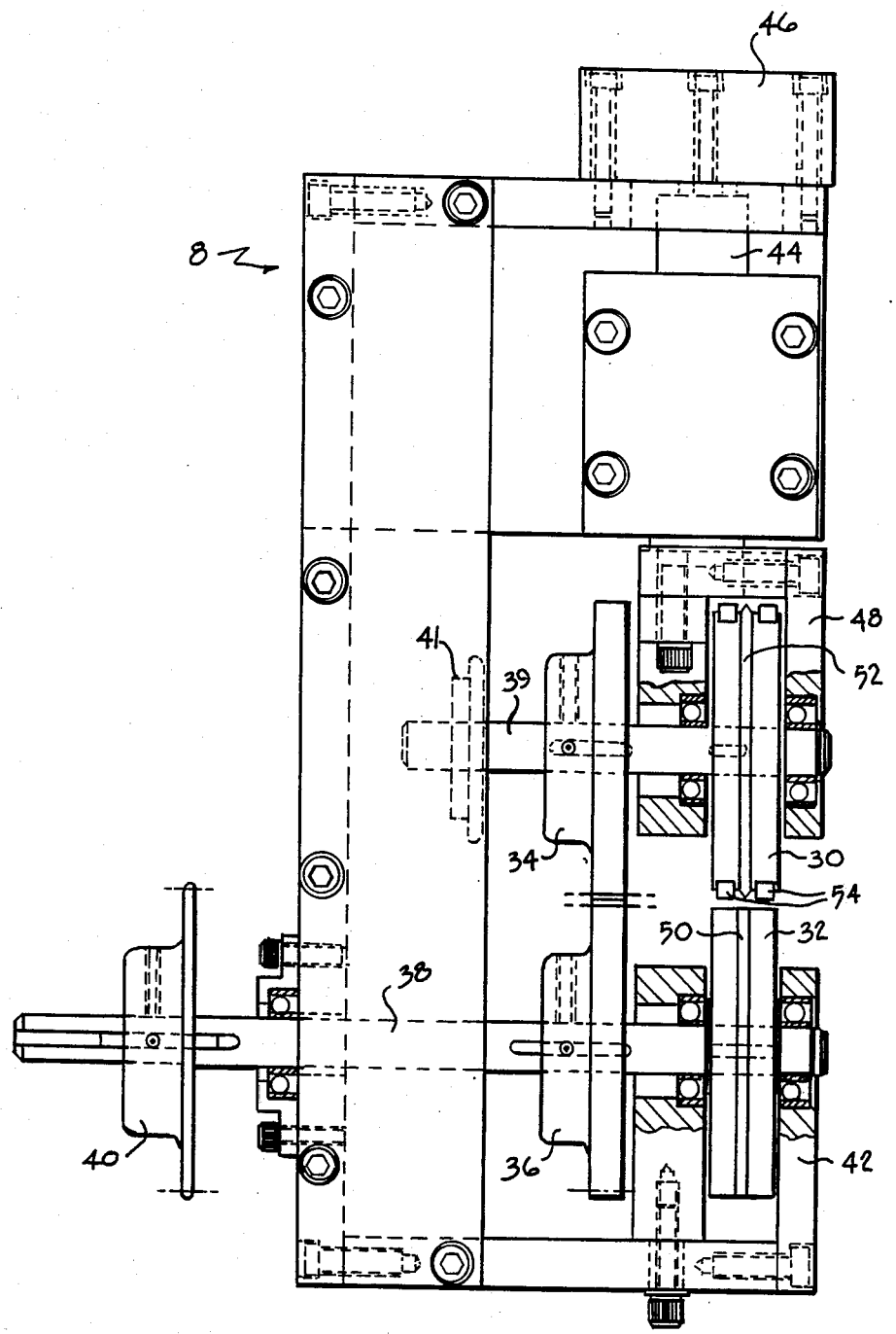
FIG. 2 is an end elevational view of the cutting mechanism employed in the present invention.

The cutter device 8, which is employed in the present invention, is more fully described in FIG. 2.

A pair of rollers 30 and 32 are mounted by means of meshed gears 34 and 36 for rotation. Gear 36 is mounted by means of shaft 38 to pulley 40. Pulley 40 is driven by means (not shown) so that speed control is maintained. Roller 32 is fixedly mounted on to frame 42. Roller 30 is, however, reciprocally mounted by means of shaft 44 forming a part of air cylinder 46. Air cylinder 46 moves only slightly, however, so that the mesh between gears 34 and 36 is maintained, whether rollers 30 and 32 are in or out of contact. Roller 30 is also mounted onto shaft 39, to which is attached sproket 41, which drives band 18 when film 10 is in motion.

Roller 32 may be formed of numerous combinations of materials, but typically includes a hardened steel roller 50, surrounded by discs of indentical diameter which may be formed of numerous materials, so as to provide the friction required to drive film 10. This disc 50 permits cutting blade 52 of roller 30 to cut film positioned between rollers 30 and 32 when closed. Roller 30, which is made from a pair of discs having grooves which contain pressure rings 54, such as rubber rings, and a knife 52 to maintain frictional contact between rollers 30 and 32 when closed and to provide the driving force for the film 10 between the rollers.

As previously mentioned, rollers 30 and 32 are positioned as close as possible to sealing band 18, such that the film 10 is maintained in registry and that an even cut is provided. Because of this, the film 10 is at an elevated temperature when it arrives at cutter 8, necessitating the rotating of cutting blade 52 and roller assemblies 30 and 32, rather than a single stationary cutting surface, as is common in the art.

From the foregoing, it is clear that the present invention provides a simple, yet effective system for providing a side seam to films which do not adapt themselves well to continuous hot wire bead sealing.

While the invention has been described with reference to certain specific embodiments thereof, it is not intended to be so limited thereby, except as set forth in the accompanying claims.

We claim:

1. A method for forming a fin seal along an edge of a plastics resin film comprising passing an end of said film between a pair of guide rollers, passing said end between a heated, driven band sealing surface and a backup surface to form a sealed region within said end, and subsequently driving said end and cutting excess material from said end, including a portion of said sealed region, to thereby form said edge by passing said end between a rotating drive wheel having a cutting knife therein and a rotating backup wheel, said drive wheel and said backup wheel being sufficiently close to said band such that said end remains in registry during sealing and cutting and said sealed region is cut while at an elevated temperature.

2. The method of claim 1 further comprising collecting said excess material.

3. The method of claim 2 wherein said collecting is accomplished by means of a vacuum.

4. The method of claim 1 wherein said plastics resin film is a polyvinyl chloride film.

5. Apparatus for forming a fin seal along an edge of a plastics resin film comprising a pair of guide rollers, a band, means for driving said band, means for heating said band, a backup surface against which an end portion of said film is held to form a sealed region within said end by said band, and a means for subsequently driving said end and cutting excess material from said end, including a portion of said sealed region, to thereby form said edge comprising a rotating drive wheel having a cutting knife therein, a rotating backup wheel and a means for driving said drive wheel and said backup wheel, said drive wheel and said backup wheel being positioned sufficiently close to said band such that said end remains in registry during sealing and cutting and said sealed region is cut while at an elevated temperature.

6. The apparatus of claim 5 further comprising means for collecting said excess material.

7. The apparatus of claim 6 wherein said collecting means comprises vacuum means.

* * * * *